(12) United States Patent
Fukuhara et al.

(10) Patent No.: US 9,751,963 B2
(45) Date of Patent: Sep. 5, 2017

(54) VINYL RESIN PRODUCTION METHOD

(71) Applicants: KURARAY CO., LTD., Kurashiki-shi (JP); KURARAY EUROPE GMBH, Hattersheim am Main (DE)

(72) Inventors: Tadahito Fukuhara, Kurashiki (JP); Yosuke Kumaki, Kurashiki (JP); Samuel Michel, Hattersheim am Main (DE); Dirk Hartmann, Hattersheim am Main (DE)

(73) Assignees: KURARAY CO., LTD., Kurashiki-shi (JP); KURARAY EUROPE GmbH, Hattersheim am Main (DE)

( * ) Notice: Subject to any disclaimer, the term of this patent is extended or adjusted under 35 U.S.C. 154(b) by 0 days.

(21) Appl. No.: 15/302,281

(22) PCT Filed: Apr. 8, 2015

(86) PCT No.: PCT/JP2015/060958
§ 371 (c)(1),
(2) Date: Oct. 6, 2016

(87) PCT Pub. No.: WO2015/156311
PCT Pub. Date: Oct. 15, 2015

(65) Prior Publication Data
US 2017/0029540 A1 Feb. 2, 2017

(30) Foreign Application Priority Data
Apr. 9, 2014 (JP) ................. 2014-080600

(51) Int. Cl.
C08F 2/20 (2006.01)
C08F 114/06 (2006.01)
C08F 2/18 (2006.01)
C08F 14/06 (2006.01)

(52) U.S. Cl.
CPC ............ C08F 114/06 (2013.01); C08F 2/20 (2013.01); *C08F 2/18* (2013.01); *C08F 14/06* (2013.01); *C08F 2400/00* (2013.01)

(58) Field of Classification Search
None
See application file for complete search history.

(56) References Cited

U.S. PATENT DOCUMENTS

| | | | |
|---|---|---|---|
| 5,204,421 A | 4/1993 | Amano et al. | |
| 2005/0197476 A1 | 9/2005 | Ooura et al. | |
| 2008/0176995 A1 | 7/2008 | Ooura et al. | |
| 2009/0292091 A1* | 11/2009 | Benetta | C08F 14/06 526/191 |
| 2010/0041828 A1* | 2/2010 | Kato | C08F 2/20 525/57 |
| 2014/0275425 A1* | 9/2014 | Kim | C08F 214/06 525/227 |
| 2015/0191558 A1* | 7/2015 | Fukuhara | C08F 214/18 525/57 |
| 2015/0329713 A1* | 11/2015 | Fukuhara | C08F 116/06 525/57 |
| 2016/0194412 A1* | 7/2016 | Fukuhara | C08F 18/04 524/557 |
| 2016/0194416 A1* | 7/2016 | Fukuhara | C08F 2/20 525/56 |
| 2016/0289360 A1* | 10/2016 | Pascual Fernndez | C08F 214/06 |
| 2017/0129979 A1* | 5/2017 | Chabrol | C08F 2/20 |

FOREIGN PATENT DOCUMENTS

| | | | | |
|---|---|---|---|---|
| JP | 3-64302 A | | 3/1991 | |
| JP | 07062006 A | * | 3/1995 | |
| JP | 08109206 A | * | 4/1996 | ............ C08F 2/20 |
| JP | 09077807 A | * | 3/1997 | |
| JP | 9-132608 A | | 5/1997 | |
| JP | 10-101715 A | | 4/1998 | |
| JP | 10-101737 | | 4/1998 | |
| JP | 2002037807 A | * | 2/2002 | |
| JP | 2005-82665 A | | 3/2005 | |
| JP | 2005-281680 A | | 10/2005 | |
| JP | 2008-202034 A | | 9/2008 | |

OTHER PUBLICATIONS

International Search Report dated Jun. 30, 2015 in PCT/JP2015/060958 filed Apr. 8, 2015.
U.S. Appl. No. 15/302,307, filed Oct. 6, 2016, Fukuhara, et al.

* cited by examiner

Primary Examiner — Richard A Huhn
(74) Attorney, Agent, or Firm — Oblon, McClelland, Maier & Neustadt, L.L.P.

(57) ABSTRACT

A dispersion stabilizer in the present invention contains an aqueous emulsion (a) obtained by dispersing a polymer (A) having an ethylenically unsaturated monomer unit in an aqueous medium, a PVA (B) having a degree of saponification of 65 mol % or more and less than 82 mol % and a viscosity-average degree of polymerization of 250 or more and less than 1500, and a PVA (C) having a degree of saponification of 82 mol % or more and less than 98 mol % and a viscosity-average degree of polymerization of 1500 or more and less than 4000. The dispersion stabilizer contains: 7 to 51 mass % of the polymer (A); 40 to 84 mass % of the PVA (B); and 9 to 53 mass % of the PVA (C), with respect to a total amount of the polymer (A), the PVA (B), and the PVA (C). A vinyl resin satisfying required performance can be obtained using the dispersion stabilizer.

6 Claims, No Drawings

VINYL RESIN PRODUCTION METHOD

TECHNICAL FIELD

The present invention relates to a method for producing a vinyl resin by suspension polymerization of a vinyl compound, using an aqueous emulsion obtained by dispersing a polymer having an ethylenically unsaturated monomer unit in an aqueous medium and two or more types of polyvinyl alcohols.

BACKGROUND ART

Conventionally, a method using a partially saponified polyvinyl alcohol (polyvinyl alcohol may hereinafter be abbreviated as PVA) as a dispersion stabilizer for suspension polymerization of a vinyl compound (such as vinyl chloride) has been known. However, the partially saponified PVA has low solubility in water, and it is difficult to increase the solid content ratio, resulting in insufficient handleability. Therefore, in order to improve the handleability, attempts to use an aqueous emulsion as a dispersion stabilizer for suspension polymerization have been made. Further, in the suspension polymerization of a vinyl compound, attempts to control the properties of the resultant vinyl resin by the combination of PVA to be used are sometimes made. However, in the case of using the partially saponified PVA, the polymerization is rendered unstable depending on the combination of PVA to be used in the suspension polymerization, which may result in production of coarse particles or deterioration in properties of the vinyl resin to be obtained in some cases.

Examples of such an attempt to use an aqueous emulsion as the dispersion stabilizer for suspension polymerization of a vinyl compound include methods disclosed in Patent Documents 1 and 2. Examples of the attempts to devise a combination of PVA to be used include a method disclosed in Patent Document 3. In recent years, examples of requirements for the combination of a dispersant and a dispersion stabilizer to be used include (1) allowing high plasticizer absorption and easy processing, (2) allowing a small number of fish-eyes in sheet formation, (3) allowing excellent polymerization stability and a small number of coarse particles, (4) allowing a resin having high bulk specific gravity to be obtained, and (5) allowing excellent handleability of the dispersion stabilizer.

According to Patent Document 3, two types of PVA having different degrees of saponification and degrees of polymerization are used together with a partially saponified PVA. The partially saponified PVA is not dissolved or dispersed in water, thus having a problem in handleability mentioned above as the requirement (5), and the other performance also cannot be said to be satisfactory.

PRIOR ART DOCUMENTS

Patent Documents

Patent Document 1: JP 2005-82665 A
Patent Document 2: JP 9-132608 A
Patent Document 3: JP 10-101715A

SUMMARY OF THE INVENTION

Problems to be Solved by the Invention

It is an object of the present invention to provide a method for producing a vinyl resin that satisfies the aforementioned required performance (1) to (5), particularly, that has excellent polymerization stability, and that is capable of reducing fish-eyes in formation of a resin sheet, in suspension polymerization of a vinyl compound including vinyl chloride.

Means for Solving the Problems

As a result of diligent studies in view of such a current situation, the inventors have found that the aforementioned object can be achieved by performing suspension polymerization of a vinyl compound in the presence of an aqueous emulsion obtained by dispersing a polymer having an ethylenically unsaturated monomer unit in an aqueous medium and two or more types of polyvinyl alcohols having specific degrees of saponification and specific degrees of polymerization at specific ratios.

That is, the present invention is a method for producing a vinyl resin, comprising suspension polymerization of a vinyl compound in an aqueous medium using a dispersion stabilizer, wherein the dispersion stabilizer contains: an aqueous emulsion (a) obtained by dispersing a polymer (A) having an ethylenically unsaturated monomer unit in an aqueous medium; a polyvinyl alcohol (B) with a degree of saponification of 65 mol % or more and less than 82 mol % and a viscosity-average degree of polymerization of 250 or more and less than 1500; and a polyvinyl alcohol (C) with a degree of saponification of 82 mol % or more and less than 98 mol % and a viscosity-average degree of polymerization of 1500 or more and less than 4000, and the dispersion stabilizer contains: 7 to 51 mass % of the polymer (A); 40 to 84 mass % of the polyvinyl alcohol (B); and 9 to 53 mass % of the polyvinyl alcohol (C), with respect to a total amount of the polymer (A), the polyvinyl alcohol (B), and the polyvinyl alcohol (C).

At this time, it is preferable that a solid content of the aqueous emulsion (a) is 35 to 70 mass %.

It is preferable that the polymer (A) contain a polyvinyl ester. It is also preferable that the polyvinyl ester is polyvinyl acetate.

It is preferable that a block character of residual vinyl ester groups in each of the polyvinyl alcohol (B) and the polyvinyl alcohol (C) is 0.55 or less.

It is preferable that a mass ratio (vinyl compound/aqueous medium) of the vinyl compound with respect to the aqueous medium is 0.57 to 1.25.

Effects of the Invention

The production method of the present invention allows a vinyl resin that satisfies the required performance to be obtained. The production method of the present invention particularly allows excellent polymerization stability. The production method of the present invention can provide a vinyl resin in which fish-eyes in formation of a resin sheet are reduced.

MODES FOR CARRYING OUT THE INVENTION

<Dispersion Stabilizer for Suspension Polymerization>

A dispersion stabilizer used in the present invention contains an aqueous emulsion (a) obtained by dispersing a polymer (A) having an ethylenically unsaturated monomer unit in an aqueous medium, a polyvinyl alcohol (B) (PVA (B)) having a degree of saponification of 65 mol % or more and less than 82 mol % and a viscosity-average degree of polymerization of 250 or more and less than 1500, and a polyvinyl alcohol (C) (PVA (C)) having a degree of saponification of 82 mol % or more and less than 98 mol % and a viscosity-average degree of polymerization of 1500 or more and less than 4000. The dispersion stabilizer contains 7 to 51 mass % of the polymer (A), 40 to 84 mass % of the PVA (B), and 9 to 53 mass % of the PVA (C), with respect to the total amount of the polymer (A), the PVA (B), and the PVA (C). As long as not inhibiting the effect of the present invention, the dispersion stabilizer may contain components other than dispersion stabilizers for suspension polymerization other than the aforementioned aqueous emulsion (a), the PVA (B) and (C). In this description, the aqueous emulsion (a) may be abbreviated as emulsion, unless otherwise specified. Hereinafter, each component will be described in detail.

[Aqueous Emulsion (a)]

The synthesis method of the aqueous emulsion (a) used in the present invention is not particularly limited, but examples thereof include a method of performing emulsion polymerization by temporarily or continuously adding an ethylenically unsaturated monomer into an aqueous solution containing a suitable dispersant and adding a polymerization initiator such as a peroxide polymerization initiator, e.g., hydrogen peroxide, ammonium persulfate, and potassium persulfate. In the synthesis of the aqueous emulsion (a), one type of ethylenically unsaturated monomer may be used alone, or two or more types thereof may be used in combination. The polymerization initiator may be used in combination with a reductant to be used in a redox system in some cases. In that case, hydrogen peroxide is generally used together with tartaric acid, sodium tartrate, L-ascorbic acid, Rongalite, or the like. Further, ammonium persulfate and potassium persulfate are used together with sodium bisulfite, sodium hydrogen carbonate, or the like.

The dispersant used in the synthesis of the aqueous emulsion (a) is not particularly limited, but a nonionic surfactant, an ionic surfactant, a polyvinyl alcohol, a water-soluble cellulose, or the like can be used therefor. One of these may be used alone, or different two or more types of dispersants may be used in combination. In the light of improving economic efficiency, emulsion stability, and a performance as the dispersant for suspension polymerization, one of the polyvinyl alcohol, the nonionic surfactant, and the ionic surfactant is preferably used. In the synthesis of the aqueous emulsion (a), the performance of the dispersion stabilizer is improved by using one of the polyvinyl alcohol, the nonionic surfactant, and the ionic surfactant as the dispersant. The polymerization is stabilized. The plasticizer absorption of the vinyl resin to be obtained is improved.

Examples of the aforementioned nonionic surfactant include polyoxyethylene polyoxyalkylene glycols such as polyethylene glycol, polypropylene glycol, and polyoxyethylene polyoxypropylene glycol, polyethylene glycol esters such as polyethylene glycol stearate, polyoxyethylene alkyl ethers such as polyoxyethylene lauryl ether, surfactants containing a polyoxyethylene group and an aromatic ring such as polyoxyethylene distyrenated phenyl ether, polyoxyethylene sorbitan esters such as polyoxyethylene sorbitan monolaurate, glycerin esters such as glycerol monostearate, and reactive surfactants such as polyoxyethylene allyl glycidyl nonyl phenyl ether. One of these may be used alone, or two or more of them may be used in combination. In the light of improving the economic efficiency and the performance of the dispersion stabilizer and to stabilize the emulsion, polyoxyethylene alkyl ethers, polyoxyethylene sorbitan esters, and glycerin esters are suitably used.

Examples of the aforementioned ionic surfactant include sodium alkyl sulfates such as sodium lauryl sulfate, sodium polyoxyethylene alkyl sulfates such as sodium polyoxyethylene laurylether sulfate, alkyl aryl sulfonates such as sodium dodecylbenzenesulfonate, alkyl amine acetates such as stearylamine acetate, alkyl ammonium salts such as stearyl trimethyl ammonium chloride, alkyl betaines such as lauryl betaine, and other alkylsulfonic acid metal salts and polycarboxylic acid salts. One of these may be used alone, or two or more of them may be used in combination. In the light of improving the economic efficiency and the performance of the dispersion stabilizer and to stabilize the emulsion, sodium alkyl sulfates, sodium polyoxyethylene alkyl sulfates, alkyl aryl sulfonates, alkyl ammonium salts, and alkyl betaines are suitably used.

In the case where the dispersant is a polyvinyl alcohol (PVA), the degree of saponification of PVA is generally 50 mol % or more, preferably 60 mol % or more, more preferably 70 mol % or more, further preferably 73 mol % or more, particularly preferably 78 mol % or more, in view of the stability and handleability of the emulsion. The upper limit is preferably 99.5 mol % or less, more preferably 95 mol % or less, further preferably 90 mol % or less. Further, the viscosity-average degree of polymerization of PVA is generally 100 to 8000, preferably 100 to 4000, more preferably 150 to 3000.

The degree of saponification of the aforementioned PVA is a value obtained by measurement according to JIS-K6726. The viscosity-average degree of polymerization is calculated using Nakajima's equation (Akio Nakajima, "Kobunshi-Kagaku" (Polymer Science) 6 (1949)) from a limiting viscosity determined for an acetone solution of a vinyl ester polymer produced by substantially completely saponifying a PVA polymer followed by acetylation.

As a method for producing the aforementioned PVA, the same production method as for the PVA (B) and the PVA (C), which will be described below, can be mentioned, for example.

Further, as the dispersant used in the synthesis of the aqueous emulsion (a), the PVA (B) and the PVA (C), which will be described below, also can be used.

Examples of the water-soluble cellulose include various cellulose derivatives such as methyl cellulose, carboxymethyl cellulose, hydroxyethyl cellulose, and hydroxypropyl cellulose. One of these may be used alone, or two or more of them may be used in combination. The viscosity of the water-soluble cellulose is not particularly limited, but is generally 0.5 mPa·s or more and 5000 mPa·s or less, as an aqueous solution with a concentration of 2% at 20° C., in view of the stability and handleability of the emulsion.

The amount of the aforementioned dispersant to be used is not specifically limited, but is generally 0.5 to 20 parts by mass with respect to 100 parts by mass of the ethylenically unsaturated monomer. In the case where the amount of the dispersant to be used exceeds 20 parts by mass, fish-eyes may possibly increase when the vinyl resin obtained by polymerization is processed into a sheet. The hue also may possibly deteriorate during the processing. The amount of the dispersant to be used is preferably 15 parts by mass or less, more preferably 12 parts by mass or less. On the other hand, in the case where the amount of the dispersant to be used is less than 0.5 parts by mass, the stability of the emulsion may possibly decrease due to an increase in particle size of the emulsion. Also, there may be cases where the emulsion cannot be obtained due to aggregating during the synthesis of the emulsion. Further, there is a possibility that the required performance of the vinyl resin cannot be satisfied due to a decrease in performance of the dispersion stabilizer.

Examples of the aforementioned ethylenically unsaturated monomer used for producing the aqueous emulsion (a) can include olefins such as ethylene, propylene, and isobutylene, halogenated olefins such as vinyl chloride, vinyl fluoride, vinylidene chloride, and vinylidene fluoride, vinyl esters such as vinyl formate, vinyl acetate, vinyl propionate, vinyl butyrate, vinyl valerate, vinyl laurate, vinyl stearate, vinyl pivalate, isopropenyl acetate, vinyl palmitate, and vinyl benzoate, acrylic acid esters such as acrylic acid, methacrylic acid, methyl acrylate, ethyl acrylate, butyl acrylate, 2-ethylhexyl acrylate, dodecyl acrylate, and 2-hydroxyethyl acrylate, methacrylic acid esters such as methyl methacrylate, ethyl methacrylate, butyl methacrylate, 2-ethylhexyl methacrylate, dodecyl methacrylate, and 2-hydroxyethyl methacrylate, dimethylaminoethyl acrylate, and dimethylaminoethyl methacrylate, and quaternized products thereof. Further, examples thereof can include acrylamide monomers such as acrylamide, methacrylamide, N-methylol acrylamide, N,N-dimethyl acrylamide, and acrylic amide-2-methyl propanesulfonic acid, and sodium salts thereof, styrene monomers such as styrene, α-methylstyrene, and p-styrenesulfonic acid, and sodium salts and potassium salts thereof, and other N-vinylpyrrolidone. One of these unsaturated monomers can be used alone, or two or more of them can be mixed for use. In view of the performance and the economic efficiency of the dispersion stabilizer, the ethylenically unsaturated monomer is preferably a vinyl ester, and the polymer (A) preferably contains a polyvinyl ester.

Examples of the vinyl ester that is suitably used include vinyl formate, vinyl acetate, vinyl propionate, vinyl butyrate, vinyl valerate, vinyl laurate, vinyl stearate, vinyl pivalate, isopropenyl acetate, vinyl palmitate, and vinyl benzoate, as mentioned above. The polymer (A) is obtained by homopolymerization or copolymerization of these. Above all, use of vinyl acetate by homopolymerization or use of vinyl acetate as a main component by copolymerization with the aforementioned ethylenically unsaturated monomer is preferable, in view of the productivity, economic efficiency, and handleability of the aqueous emulsion (a).

Examples of the aqueous medium contained in the emulsion include water and a solution containing water and organic solvent. The amount of the water in the aqueous medium is preferably 90 mass % or more.

The average particle size of the particles contained in the emulsion (a) is not particularly limited. The average particle size is preferably 0.05 to 5 μm as a value measured by the dynamic light scattering method. In the case where the average particle size exceeds 5 μm, the stability of the emulsion may possibly decrease. The average particle size is more preferably 3 μm or less, further preferably 2.5 μm or less. On the other hand, in the case where the average particle size is less than 0.05 μm, fish-eyes when the vinyl resin is processed into a sheet may possibly increase. In the synthesis of the emulsion, a large amount of the dispersant needs to be used, and there is a concern also in view of the economic efficiency. The measurement by the dynamic light scattering method can be performed, for example, using a laser zeta potential meter "ELS-8000", manufactured by Otsuka Electronics Co., Ltd. The average particle size of the particles can be adjusted by appropriately selecting the mass ratio of the dispersant to the ethylenically unsaturated monomer to be used in the synthesis of the emulsion and the synthesis conditions of the emulsion (such as polymerization temperature, polymerization time, type of the monomer, type of the polymerization initiator, addition timing of the dispersant, and the amount of chain transfer agent to be used). Further, the stability of the emulsion can be controlled also by adjusting the solid content concentration of the emulsion.

The aqueous emulsion (a) can be obtained also by emulsion polymerization in the presence of a thiol compound and/or an aldehyde compound as a chain transfer agent. This enables stabilization of the emulsion or reduction of viscosity of the emulsion, thereby improving the handleability. Use of a thiol compound is preferable because of its high reactivity. The thiol compound and/or the aldehyde compound may be added either temporarily or continuously. Further, the amount of chain transfer agent to be used is not particularly limited, but the use ratio thereof is 0.01 mass % or more and 50 mass % or less, preferably 0.05 mass % or more and 40 mass % or less, further preferably 0.1 mass % or more and 30 mass % or less, with respect to one or two or more types of ethylenically unsaturated monomers.

The aforementioned thiol compound is not particularly limited, and either alkylthiols or thiols having a functional group can be used. In the case of using alkylthiols, straight chain or branched alkylthiols having 4 or more and 18 or less carbon atoms are preferable in view of the handleability, odor, or the like, and examples thereof include n-butanethiol, n-pentanethiol, n-hexanethiol, cyclohexanethiol, adamantylthiol, n-heptanethiol, n-octanethiol, n-nonanethiol, n-decanethiol, n-undecanethiol, n-dodecanethiol, t-dodecanethiol, n-hexadecanethiol, and n-octadecanethiol. In the case of using the thiols having a functional group, thioacetic acid, mercaptoacetic acid, 3-mercaptopropionic acid, 3-mercaptopropanesulfonic acid, or 2-mercaptoethanol can be used, for example. However, there is no limitation only to these.

In the case where the aqueous emulsion (a) is synthesized using the dispersant, a graft polymer may be present in the aqueous emulsion (a) due to graft polymerization of the dispersant and the ethylenically unsaturated monomer unit in some cases, depending on the synthesis conditions. The ratio of the dispersant with respect to the total solid content of the emulsion is preferably 0.1 mass % or more and 18 mass % or less. In the case where the ratio is less than 0.1 mass %, there is a possibility that the dispersion stabilization of the polymer (A) is rendered difficult, and that the solution stability of the emulsion decreases. The plasticizer absorption of the vinyl resin to be obtained also may possibly decrease. Fish-eyes when the vinyl resin is processed into a sheet also may possibly increase. The ratio is more preferably 0.5 mass % or more, further preferably 1 mass % or more. On the other hand, when the ratio exceeds 18 mass %, there is a possibility that the viscosity of the emulsion increases, a concentration of the solution becomes high, and the handleability decreases. The plasticizer absorption of the vinyl resin to be obtained also may possibly decrease. There is also a possibility that the number of fish-eyes when the vinyl resin is processed into a sheet increases, or the hue of the vinyl resin deteriorates. The ratio is more preferably 15 mass % or less, further preferably 12 mass % or less. Examples of a method for adjusting the ratio, in the case of using PVA as the dispersant in the synthesis of the emulsion, include a method of appropriately selecting the degree of saponification or the degree of polymerization of the PVA. Examples of the method for adjusting the ratio also include a method of changing the probability of graft reaction by using a dispersant in which the graft point is present, adjusting the amount of the dispersant to be used, or using a chain transfer agent or an additive.

In the case where the aforementioned graft polymer is contained in the aqueous emulsion (a), the ratio of the graft polymer is preferably 0 mass % or more and less than 85 mass %, with respect to the total solid content of the emulsion. In the case where the ratio is 85 mass % or more, the plasticizer absorption of the vinyl resin to be obtained may possibly decrease. There is also a possibility that the hue deteriorates, or fish-eyes increases, when the vinyl resin is processed into a sheet. The ratio is more preferably less than 80 mass %, further preferably less than 75 mass %. When the ratio of the graft polymer falls within such a range, coarse particles of the vinyl resin can be prevented, or the bulk specific gravity can be increased. Examples of a method for adjusting the ratio, in the case of using PVA as the dispersant in the synthesis of the emulsion, include a method of appropriately selecting the degree of saponification or the degree of polymerization of the PVA. Examples of the method for adjusting the ratio can include methods of using a dispersant (such as a surfactant) in which grafting is difficult, adjusting the amount of the dispersant to be used, adjusting the conditions in the synthesis, using a chain transfer agent, and changing the amount of the polymer having the ethylenically unsaturated monomer unit.

The ratio of the graft polymer with respect to the total solid content of the emulsion can be determined by various methods, and examples thereof include a method of washing the emulsion with acetone and water (see Patent Documents 1 and 2), and a determination method by subtracting the ratio of the dispersant from the ratio of toluene insolubles with respect to the total solid content of the emulsion (see JP10-081865 A). The former is a method of removing the polymer having the ethylenically unsaturated monomer unit by acetone and thereafter removing the dispersant by water. As to the latter method, since the toluene insolubles are the graft polymer and the dispersant, the ratio of the graft polymer is obtained by subtracting the ratio of the dispersant that has been determined by another method (the solid content ratio in the water phase separated by centrifugation) from the ratio of the toluene insolubles. These two are equivalent, and therefore the values of the ratio of the graft polymer are almost the same even if either of the methods is used. In the case of using the former method for determination, the same sample is washed with water and acetone, and therefore the ratio of the graft polymer remaining undissolved in water or acetone is 0 or more. In the case of using the latter method, different samples are used for two types of measurements, and therefore the ratio of the graft polymer may take a negative value in some cases, depending on the margin of error of the measurements. Therefore, the ratio of the graft polymer can be determined more accurately by measuring toluene insolubles for a precipitate from which the dispersant is removed by centrifugation of the emulsion solution.

The weight-average molecular weight of the aqueous emulsion (a) is not particularly limited, but is preferably 4,000,000 or less. The value of the weight-average molecular weight can be adjusted, in the case of using the PVA as the dispersant in the synthesis of the emulsion, by changing the length of the backbone or branch of the graft polymer, for example, by adjusting the degree of saponification or the degree of polymerization of the PVA, by adjusting the type or amount of the dispersant, by selecting a polymerization initiator, or by using a chain transfer agent. When the weight-average molecular weight exceeds 4,000,000, the plasticizer absorption of the vinyl resin may possibly decrease. There is also a possibility that the number of fish-eyes increases, or the hue deteriorates, when the vinyl resin is processed into a sheet. There is also a possibility that the viscosity of the emulsion to be obtained increases, or the storage stability deteriorates.

The solid content of the aqueous emulsion (a) is preferably 35 to 70 mass %. In the case where the solid content exceeds 70 mass %, there is a possibility that the viscosity of the emulsion increases, and the handleability decreases. The solid content is more preferably 65 mass % or less. On the other hand, the solid content less than 35 mass % is not preferable in view of the productivity and the economic efficiency. There is also a possibility that the viscosity of the emulsion excessively decreases, and the solution stability of the emulsion decreases.

[PVA (B) and PVA (C)]

In the production method of the present invention, the dispersion stabilizer contains the PVA (B) having a degree of saponification of 65 mol % or more and less than 82 mol %, and a viscosity-average degree of polymerization of 250 or more and less than 1500, and the PVA (C) having a degree of saponification of 82 mol % or more and less than 98 mol %, and a viscosity-average degree of polymerization of 1500 or more and less than 4000, together with the aqueous emulsion (a) obtained by dispersing the polymer (A) having an ethylenically unsaturated monomer unit in an aqueous medium. At this time, the dispersion stabilizer contains 7 to 51 mass % of the polymer (A), 40 to 84 mass % of the PVA (B), and 9 to 53 mass % of the PVA (C), with respect to the total amount of the polymer (A), the PVA (B), and the PVA (C). This allows the vinyl resin to satisfy the required performance such as improving the plasticizer absorption, reducing the number of fish-eyes when processed into a sheet, reducing coarse particles, and increasing the bulk specific gravity. In order to obtain such a vinyl resin satisfying the required performance, the balance of the components is important.

In the case where the content of the PVA (B) is less than 40 mass %, the polymerization is unstabilized, and the particles of the vinyl resin to be obtained become coarse, resulting in difficulty in processing. The content of the PVA (B) is preferably 45 mass % or more. On the other hand, in the case where the content of the PVA (B) exceeds 84 mass %, the ratios of the polymer (A) and the PVA (C) in the dispersion stabilizer are excessively low, and the plasticizer absorption of the vinyl resin to be obtained decreases. The number of fish-eyes increases when the vinyl resin is processed into a sheet. The bulk specific gravity decreases. The content of the PVA (B) is preferably 75 mass % or less.

In the case where the content of the PVA (C) is less than 9 mass %, the bulk specific gravity of the vinyl resin to be obtained decreases. The polymerization is unstabilized, and the particles become coarse. The content of the PVA (C) is preferably 15 mass % or more. On the other hand, in the case where the content of the PVA (C) exceeds 53 mass %, the plasticizer absorption of the vinyl resin to be obtained decreases. The number of fish-eyes increases when the vinyl resin is processed into a sheet. The content of the PVA (C) is preferably 45 mass % or less.

It is important that the degree of saponification of the aforementioned PVA (B) is 65 mol % or more and less than 82 mol %. In the case where the degree of saponification is less than 65 mol %, the water solubility decreases, and therefore the PVA (B) is insoluble in water, resulting in a decrease in handleability when used in the suspension polymerization. The degree of saponification is preferably 68 mol % or more. On the other hand, in the case where the degree of saponification is 82 mol % or more, the plasticizer absorption of the vinyl resin to be obtained decreases. The number of fish-eyes increases when the vinyl resin is processed into a sheet. The polymerization is unstabilized, and the particles of the vinyl resin to be obtained become coarse. The degree of saponification is preferably less than 80 mol %, more preferably less than 78 mol %. The degree of saponification of the PVA (B) is a value obtained by measurement according to JIS-K6726.

It is important that the viscosity-average degree of polymerization of the aforementioned PVA (B) is 250 or more and less than 1500. In the case where the viscosity-average degree of polymerization is less than 250, the polymerization stability in the suspension polymerization of the vinyl compound decreases, and the particles of the vinyl resin to be obtained become coarse. The viscosity-average degree of polymerization is preferably 300 or more, more preferably 350 or more. On the other hand, in the case where the viscosity-average degree of polymerization is 1500 or more, the plasticizer absorption of the vinyl resin to be obtained decreases. The number of fish-eyes increases when the vinyl resin is processed into a sheet. The polymerization is unstabilized, and the particles of the vinyl resin become coarse. The viscosity-average degree of polymerization is preferably less than 1300, more preferably 1200 or less. The viscosity-average degree of polymerization of the PVA(B) is calculated using Nakajima's equation (Akio Nakajima, "Kobunshi-Kagaku" (Polymer Science) 6 (1949)) from a limiting viscosity determined for an acetone solution of a vinyl ester polymer produced by substantially completely saponifying the PVA(B) polymer followed by acetylation.

It is important that the degree of saponification of the aforementioned PVA (C) is 82 mol % or more and less than 98 mol %. In the case where the degree of saponification is less than 82 mol %, the water solubility decreases, resulting in a decrease in handleability when used in the suspension polymerization. The bulk specific gravity of the vinyl resin to be obtained decreases. The degree of saponification of the PVA (C) is preferably 85 mol % or more, more preferably 86 mol % or more. On the other hand, in the case where the degree of saponification is 98 mol % or more, the polymerization is unstabilized, and the particles of the vinyl resin become coarse. The plasticizer absorption of the vinyl resin to be obtained decreases. The number of fish-eyes increases when the vinyl resin is processed into a sheet. The degree of saponification is preferably less than 95 mol %, more preferably less than 93 mol %. The degree of saponification of the PVA (C) is a value obtained by measurement according to JIS-K6726.

It is important that the viscosity-average degree of polymerization of the aforementioned PVA (C) is 1500 or more and less than 4000. In the case where the viscosity-average degree of polymerization is less than 1500, the bulk specific gravity of the vinyl resin to be obtained decreases. The viscosity-average degree of polymerization is preferably 1700 or more, more preferably 1800 or more. On the other hand, in the case where the viscosity-average degree of polymerization is 4000 or more, the water solubility decreases, and the handleability decreases. The plasticizer absorption of the vinyl resin to be obtained decreases. The number of fish-eyes increases when the vinyl resin is processed into a sheet. The particles of the vinyl resin become coarse. The viscosity-average degree of polymerization is preferably less than 3700, more preferably 3500 or less. The viscosity-average degree of polymerization of the PVA(C) is calculated using Nakajima's equation (Akio Nakajima, "Kobunshi-Kagaku" (Polymer Science) 6 (1949)) from a limiting viscosity determined for an acetone solution of a vinyl ester polymer produced by substantially completely saponifying the PVA(C) polymer followed by acetylation.

The PVA (B) and the PVA (C) mentioned above can be obtained according to conventionally known methods by polymerization of vinyl ester monomers and saponification of the obtained polymer using conventional methods. As the method for polymerization of the vinyl ester monomers, conventionally known methods such as a solution polymerization method, a bulk polymerization method, a suspension polymerization method, and an emulsion polymerization method can be used. As a polymerization catalyst, an azo catalyst, a peroxide catalyst, a redox catalyst, or the like, is appropriately selected, depending on the polymerization method. As a saponification reaction, conventionally known alcoholysis, hydrolysis, or the like, using an alkali catalyst or an acid catalyst, can be used. Above all, a saponification reaction using methanol as a solvent and a caustic soda (NaOH) catalyst is convenient and most preferable.

As the vinyl ester units constituting the PVA (B) and the PVA (C), there are units derived from various vinyl ester compounds, but examples thereof include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Above all, vinyl acetate is most preferable.

In the case of using PVA as a dispersant in the synthesis of the PVA (B) and the PVA (C), a polyvinyl alcohol obtained by copolymerization with other monomers may be used, as long as not inhibiting the effect of the present invention. Examples of the monomers that can be used include α-olefins such as ethylene, propylene, n-butene, and isobutylene; acrylic acid and salts thereof; acrylamides; acrylamide derivatives such as N-methyl acrylamide, N-ethyl acrylamide, N,N-dimethyl acrylamide, diacetoneacrylamide, acrylamidopropanesulfonic acid and salts thereof, acrylamidopropyldimethylamine and salts or quaternary salts thereof, and N-methylol acrylamide and derivatives thereof; methacrylamides; methacrylamide derivatives such as N-methyl methacrylamide, N-ethyl methacrylamide, methacrylamidopropanesulfonic acid and salts thereof, methacrylamide propyl dimethyl amine and salts or quaternary salts thereof, and N-methylol methacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane; nitriles such as acrylonitrile, and methacrylonitrile; vinyl halides such as vinyl chloride, and vinyl fluoride; vinylidene halides such as vinylidene chloride, and vinylidene fluoride; allyl compounds such as allyl acetate, 2,3-diacetoxy-1-allyloxypropane, and allyl chloride; unsaturated dicarboxylic acids such as maleic acid, itaconic acid, fumaric acid, and salts or esters thereof; vinylsilyl compounds such as vinyltrimethoxysilane; and isopropenyl acetate. Further, a polyvinyl alcohol with high 1,2 glycol content that is obtained by saponification of a polymer obtained by polymerization of a vinyl ester monomer at higher temperature than in general polymerization conditions also can be preferably used. In this case, the content of 1,2-glycol bond is not particularly limited, but is 1.9 mol % or more, preferably 2.0 mol % or more, further preferably 2.1 mol % or more. When the 1,2-glycol bond falls within the aforementioned range, a dispersion stabilizer with particles in the emulsion having a smaller particle size can be obtained.

In the synthesis of the PVA (B) and the PVA (C), the degree of polymerization may be adjusted, or a polyvinyl alcohol synthesized using a chain transfer agent in order to modify its terminals may be used, as long as not inhibiting the effect of the present invention. Examples of the chain transfer agent include: aldehydes such as acetaldehyde, and propionaldehyde; ketones such as acetone, and methyl ethyl ketone; thiols such as 2-hydroxy ethanethiol, 3-mercaptopropionic acid, dodecanethiol, and thioacetic acid; hydrocarbon halides such as carbon tetrachloride, trichloroethylene, and perchloroethylene; and phosphinic acid salts such as sodium phosphinate monohydrate. Above all, thiols, aldehydes, and ketones are suitably used. The amount of chain transfer agent to be added may be determined corresponding to the chain transfer constant of the chain transfer agent to be added and the degree of polymerization of the target polyvinyl ester. Generally, the amount is desirably 0.1 mass % or more and 10 mass % or less with respect to the vinyl ester monomers.

In the synthesis of the PVA (B) and the PVA (C), the value of weight-average molecular weight/number-average molecular weight (Mw/Mn) is not particularly limited, but both are generally 10 or less, preferably 6 or less, in view of the stability of the emulsion.

The block character of residual vinyl ester groups in each of the PVA (B) and the PVA (C) is preferably 0.55 or less. The lower limit is not particularly limited, but is generally 0.3 or more.

The present invention is a method for producing a vinyl resin, including suspension polymerization of a vinyl compound in an aqueous medium using a dispersion stabilizer. The dispersion stabilizer contains the aqueous emulsion (a) obtained by dispersing the polymer (A) having an ethylenically unsaturated monomer unit in an aqueous medium, the PVA (B), and the PVA (C). The aqueous emulsion (a) mainly contributes, for example, to improving the plasticizer absorption of the vinyl resin to be obtained, reducing the number of fish-eyes when processed into a sheet, and reducing the coarse particles. The PVA (B) mainly contributes, for example, to improving the plasticizer absorption, reducing the coarse particles, and imparting the polymerization stability. The PVA (C) mainly contributes, for example, to improving the bulk specific gravity, and stabilizing the polymerization. These effects are exerted when the polymer (A), the PVA (B), and the PVA (C) are used in combination at the aforementioned ratios. In the case where the ratio of the polymer (A) having the ethylenically unsaturated monomer unit used is low, the vinyl chloride polymer particles to be obtained have low plasticizer absorption, and the number of fish-eyes is large. In the case where the PVA (B) is not used, the vinyl chloride polymer particles to be obtained have low plasticizer absorption, the particles are coarse, and the number of fish-eyes is very large. Further, in the case where the ratio of the PVA (C) used is low or the PVA (C) is not used, the vinyl chloride polymer particles to be obtained have low bulk specific gravity, and the particles are coarse.

[Other Components]

In the production method of the present invention, additives other than the aqueous emulsion (a), the PVA (B), and the PVA (C) may be added, as long as not inhibiting the effect of the present invention. Examples of the other additives include polymerization regulators such as aldehydes, halides hydrocarbons, and mercaptans; polymerization inhibitors such as phenol compounds, sulfur compounds, and N-oxide compounds; pH adjusters; crosslinking agents; preservatives; fungicides; antiblocking agents; and defoamers.

Examples of the vinyl compound to be used in the production method of the present invention include vinyl halides such as vinyl chloride; vinyl esters such as vinyl acetate and vinyl propionate; acrylic acid and methacrylic acid, and esters and salts thereof; maleic acid and fumaric acid, and esters and anhydrides thereof; styrene; acrylonitrile; vinylidene chloride; and vinyl ether. Among these, suspension polymerization of vinyl chloride alone is suitable in the production method of the present invention. Further, suspension polymerization of vinyl chloride with another monomer copolymerizable with vinyl chloride is also suitable. Examples of the monomer copolymerizable with vinyl chloride include vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile; styrene; vinylidene chloride; and vinyl ether.

For the suspension polymerization of the vinyl compound, oil-soluble or water-soluble polymerization initiators that have been conventionally used for polymerization of vinyl chloride monomers or the like can be used. Examples of the oil-soluble polymerization initiators include percarbonate compounds such as diisopropyl peroxydicarbonate, di-2-ethylhexyl peroxydicarbonate, and diethoxyethyl peroxydicarbonate; perester compounds such as t-butyl peroxyneodecanoate, t-butyl peroxypivalate, t-hexyl peroxypivalate, and α-cumyl peroxyneodecanoate; peroxides such as acetylcyclohexylsulfonyl peroxide, 2,4,4-trimethylpentyl-2-peroxyphenoxyacetate, 3,5,5-trimethylhexanoyl peroxide, and lauroyl peroxide; and azo compounds such as azobis-2,4-dimethylvaleronitrile and azobis (4-2,4-dimethylvaleronitrile). Examples of the water-soluble polymerization initiators include potassium persulfate, ammonium persulfate, hydrogen peroxide, and cumene hydroperoxide. One of these oil-soluble or water-soluble polymerization initiators can be used alone, or two or more of them can be used in combination.

In the suspension polymerization of the vinyl compound, the polymerization temperature is not particularly limited. It is possible to adjust the temperature, of course, to a low temperature of about 20° C., also to a high temperature exceeding 90° C. Further, use of a polymerizer equipped with a reflux condenser for enhancing the heat removal efficiency from the polymerization reaction system is also one of preferable embodiments.

In the suspension polymerization of the vinyl compound, the ratio of the vinyl compound to the aqueous medium to be introduced is not specifically limited. Generally, the lower the ratio of the vinyl compound with respect to the aqueous medium, the polymerization is more stable, but the productivity is lower. On the other hand, the higher the ratio of the vinyl compound with respect to the aqueous medium, the productivity is higher, but the polymerization is less stable. In the production method of the present invention, a mass ratio (vinyl compound/aqueous medium) of the vinyl compound with respect to the aqueous medium is preferably 0.57 to 1.25. In the case where the mass ratio (vinyl compound/aqueous medium) is less than 0.57, the productivity of the vinyl resin may possibly decrease. The mass ratio (vinyl compound/aqueous medium) is more preferably 0.75 or more. On the other hand, in the case where the mass ratio (vinyl compound/aqueous medium) exceeds 1.25, there is a possibility that the polymerization stability decreases, and coarse resin particles are produced. Further, fish-eyes in a formed product of the vinyl resin to be obtained may possibly increase. The mass ratio (vinyl compound/aqueous medium) is more preferably 1.11 or less. The production method of the present invention can prevent coarse particles of the vinyl resin to be obtained, even under conditions in which the polymerization generally tends to be unstable. The production method of the present invention also can reduce fish-eyes in a formed product.

Examples of the aqueous medium in the present invention include water and a solution containing water and an organic solvent. The amount of water in the aqueous medium is preferably 90 mass % or more.

In the production method of the present invention, the aqueous emulsion (a) containing the polymer (A), the PVA (B), and the PVA (C) may be separately introduced, or may be introduced at a time. Further, the PVA (B) and the PVA (C) may be in the form of powder or an aqueous solution.

Other than the aqueous emulsion (a), the PVA (B), and the PVA (C) used in the production method of the present invention, other PVA, water-soluble cellulose ethers such as methyl cellulose, hydroxyethyl cellulose, hydroxypropyl cellulose, and hydroxypropylmethyl cellulose; water-soluble polymers such as gelatin; oil-soluble emulsifiers such as sorbitan monolaurate, sorbitan trioleate, glycerin tristearate, and a block copolymer of ethylene oxide and propylene oxide; water-soluble emulsifiers such as polyoxyethylene sorbitan monolaurate, polyoxyethylene glycerin oleate, and sodium laurate, or the like, which are generally used in suspension polymerization of a vinyl compound in an aqueous medium, may be used in combination, as long as not inhibiting the effect of the present invention. The addition amount is not particularly limited, but is preferably 0.01 part by mass or more and 1.0 part by mass or less per 100 parts by mass of the vinyl compound.

EXAMPLES

Hereinafter, the present invention will be described further in detail by way of examples. In Examples and Comparative Examples below, "part(s)" and "%" respectively indicate part(s) by mass and mass %, unless otherwise specified.

The production methods of aqueous emulsions (a1 to a7) are shown below.

[Production of Aqueous Emulsion (a1)]

161.2 parts of ion exchanged water and 7.5 parts of "EMULGEN 1150S-60" (manufactured by Kao Corporation) as the dispersant were introduced into a 2-L glass polymerization vessel equipped with a reflux condenser, a dropping funnel, a thermometer, and a nitrogen injection port, followed by complete dissolution at 80° C. Next, after nitrogen substitution, 40 parts of a 1% aqueous solution of ammonium persulfate and 100 parts of vinyl acetate as the ethylenically unsaturated monomer were continuously added thereto over 3 hours under stirring at 200 rpm to complete polymerization. The solid content of the emulsion obtained was 50 mass %.

[Production of Aqueous Emulsion (a2)]

The synthesis was performed in the same manner as in the aqueous emulsion (a1) except that the ethylenically unsaturated monomer used was changed to vinyl propionate.

[Production of Aqueous Emulsion (a3)]

The synthesis was performed in the same manner as in the aqueous emulsion (a1) except that the ethylenically unsaturated monomer used was changed to a mixture of 50 parts of methyl methacrylate (MMA) and 50 parts of butyl acrylate (BA).

[Production of Aqueous Emulsion (a4)]

The synthesis was performed in the same manner as in the aqueous emulsion (a1) except that the ethylenically unsaturated monomer used was changed to styrene.

[Production of Aqueous Emulsion (a5)]

The synthesis was performed in the same manner as in the aqueous emulsion (a5) except that PVA with a degree of polymerization of 1700 and a degree of saponification of 88 mol % was used as the dispersant.

[Production of Aqueous Emulsion (a6)]

The synthesis was performed in the same manner as in the aqueous emulsion (a1) except that 2 parts of dodecyl mercaptan dissolved in vinyl acetate was added dropwise when 100 parts of vinyl acetate was continuously added thereto over 3 hours.

[Production of Aqueous Emulsion (a7)]

900 g of ion exchanged water and 100 g of PVA with a degree of polymerization of 2000 and a degree of saponification of 80 mol % were introduced into a 2-L glass polymerization vessel equipped with a reflux condenser, a thermometer, and a nitrogen injection port, followed by complete dissolution at 80° C. Next, after cooling the PVA aqueous solution and nitrogen substitution, the liquid temperature was adjusted to 60° C. under stirring at 200 rpm. Thereafter, 25 g of vinyl acetate as the ethylenically unsaturated monomer and 5 g of a 10% aqueous solution of sodium tartrate were introduced therein. Thereafter, 50 g of a 0.5% hydrogen peroxide solution was continuously added dropwise thereto over 3 hours to perform emulsion polymerization. The solid content of the emulsion obtained was 12 mass %.

The method for measuring the block character of residual vinyl ester groups in the PVA (B) and the PVA (C) is described below.

The block character of residual vinyl ester groups was determined by performing $^{13}$C-NMR measurement of PVA in a mixed solvent of heavy water and heavy methanol at a measurement temperature of 70° C. in the accumulated number of 18000 times, from the integral value of the methylene carbon peak sandwiched by a residual ester group and a hydroxyl group, the integral value of the methylene carbon peak sandwiched by residual ester groups, and the integral value of the methylene carbon peak sandwiched by hydroxyl groups. The measurement method and the calculation method are described in POVAL (Kobunshi-Kanko Kai, published in 1984, pp. 246 to 249) and Macromolecules, 10, 532 (1977).

Example 1

The aqueous emulsion (a1) containing a polymer (A1), 100 parts of a deionized water solution of the PVA (B), and 100 parts of a deionized water solution of the PVA (C) were introduced into an autoclave with a capacity of 5 L so that the solid content ratios of the respective components were as shown in Formulation Example 1 of Table 1, and the total solid content of the components was 850 ppm with respect to the vinyl chloride monomer. Thereafter, deionized water was additionally introduced so that the total of deionized water introduced therein was 1200 parts. Subsequently, 0.65 part of a 70% toluene solution of cumyl peroxyneodecanoate and 1.05 parts of a 70% toluene solution of t-butyl peroxyneododecanoate were introduced into the autoclave, and an operation of introducing nitrogen into the autoclave to a pressure of 0.2 MPa, followed by purging the introduced nitrogen, was repeated 5 times, so that the inside of the autoclave was sufficiently substituted with nitrogen to remove oxygen therefrom. Thereafter, 940 parts of vinyl chloride was introduced therein, and the contents in the autoclave were heated to 57° C., to start polymerization of the vinyl chloride under stirring. The pressure inside the autoclave at the start of the polymerization was 0.80 MPa. After a lapse of about 3.5 hours from the start of the polymerization, the polymerization was stopped at the time when the pressure inside the autoclave reached 0.70 MPa, and then a polymerization reaction product was taken out after unreacted vinyl chloride monomer was removed, followed by drying at 65° C. for 16 hours. Thus, vinyl chloride polymer particles were obtained.

TABLE 1

| | Aqueous emulsion (a) | | | PVA(B) | | | |
|---|---|---|---|---|---|---|---|
| | Type | Unsaturated monomer constituting polymer | Solid content (mass %) | Type | Degree of saponification (mol %) | Degree of polymerization | Block character |
| Formulation Example 1 | (A1) | Vinyl acetate | 50 | (B1) | 72 | 700 | 0.482 |
| Formulation Example 2 | (A2) | Vinyl propionate | 50 | (B1) | 72 | 700 | 0.482 |
| Formulation Example 3 | (A3) | MMA/BA | 50 | (B1) | 72 | 700 | 0.482 |
| Formulation Example 4 | (A4) | Styrene | 50 | (B1) | 72 | 700 | 0.482 |
| Formulation Example 5 | (A5) | Vinyl acetate | 40 | (B1) | 72 | 700 | 0.482 |
| Formulation Example 6 | (A6) | Vinyl acetate | 55 | (B1) | 72 | 700 | 0.482 |
| Formulation Example 7 | (A1) | Vinyl acetate | 50 | (B2) | 78 | 700 | 0.476 |
| Formulation Example 8 | (A1) | Vinyl acetate | 50 | (B3) | 72 | 1450 | 0.455 |
| Formulation Example 9 | (A1) | Vinyl acetate | 50 | (B4) | 72 | 500 | 0.456 |
| Formulation Example 10 | (A1) | Vinyl acetate | 50 | (B5) | 72 | 700 | 0.535 |
| Formulation Example 11 | (A1) | Vinyl acetate | 50 | (B6) | 72 | 700 | 0.634 |
| Formulation Example 12 | (A1) | Vinyl acetate | 50 | (B1) | 72 | 700 | 0.482 |
| Formulation Example 13 | (A1) | Vinyl acetate | 50 | (B1) | 72 | 700 | 0.482 |
| Formulation Example 14 | (A1) | Vinyl acetate | 50 | (B1) | 72 | 700 | 0.482 |
| Formulation Example 15 | (A1) | Vinyl acetate | 50 | (B1) | 72 | 700 | 0.482 |
| Formulation Example 16 | (A1) | Vinyl acetate | 50 | (B1) | 72 | 700 | 0.482 |
| Formulation Example 17 | (A1) | Vinyl acetate | 50 | (B1) | 72 | 700 | 0.482 |
| Formulation Example 18 | (A1) | Vinyl acetate | 50 | (B1) | 72 | 700 | 0.482 |
| Formulation Example 19 | (A1) | Viny acetate | 50 | (B1) | 72 | 700 | 0.482 |
| Formulation Example 20 | (A1) | Vinyl acetate | 50 | (B7) | 88 | 700 | 0.466 |
| Formulation Example 21 | (A1) | Vinyl acetate | 50 | (B8) | 62 | 700 | 0.455 |
| Formulation Example 22 | (A1) | Vinyl acetate | 50 | (B9) | 72 | 2000 | 0.425 |
| Formulation Example 23 | (A1) | Vinyl acetate | 50 | (B10) | 72 | 150 | 0.436 |
| Formulation Example 24 | (A1) | Vinyl acetate | 50 | (B1) | 72 | 700 | 0.482 |
| Formulation Example 25 | (A1) | Vinyl acetate | 50 | (B1) | 72 | 700 | 0.482 |
| Formulation Example 26 | (A1) | Vinyl acetate | 50 | (B1) | 72 | 700 | 0.482 |
| Formulation Example 27 | (A1) | Vinyl acetate | 50 | (B1) | 72 | 700 | 0.482 |

TABLE 1-continued

| | | | | | | | |
|---|---|---|---|---|---|---|---|
| Formulation Example 28 | (A1) | Vinyl acetate | 50 | (B1) | 72 | 700 | 0.482 |
| Formulation Example 29 | (A1) | Vinyl acetate | 50 | (B1) | 72 | 700 | 0.482 |

| | PVA(C) | | | | Respective ratios to total content of (A), (B), and (C) | | |
|---|---|---|---|---|---|---|---|
| | Type | Degree of saponification (mol %) | Degree of polymerization | Block character | A/(A + B + C) (mass %) | B/(A + B + C) (mass %) | C/(A + B + C) (mass %) |
| Formulation Example 1 | (C1) | 88 | 2400 | 0.454 | 15 | 47 | 38 |
| Formulation Example 2 | (C1) | 88 | 2400 | 0.454 | 15 | 48 | 37 |
| Formulation Example 3 | (C1) | 88 | 2400 | 0.454 | 15 | 47 | 38 |
| Formulation Example 4 | (C1) | 88 | 2400 | 0.454 | 15 | 48 | 37 |
| Formulation Example 5 | (C1) | 88 | 2400 | 0.454 | 15 | 47 | 38 |
| Formulation Example 6 | (C1) | 88 | 2400 | 0.454 | 15 | 48 | 37 |
| Formulation Example 7 | (C1) | 88 | 2400 | 0.454 | 15 | 47 | 38 |
| Formulation Example 8 | (C1) | 88 | 2400 | 0.454 | 15 | 48 | 37 |
| Formulation Example 9 | (C1) | 88 | 2400 | 0.454 | 15 | 48 | 37 |
| Formulation Example 10 | (C1) | 88 | 2400 | 0.454 | 15 | 48 | 37 |
| Formulation Example 11 | (C1) | 88 | 2400 | 0.454 | 15 | 48 | 37 |
| Formulation Example 12 | (C2) | 94 | 2400 | 0.479 | 15 | 48 | 37 |
| Formulation Example 13 | (C3) | 84 | 2400 | 0.433 | 15 | 48 | 37 |
| Formulation Example 14 | (C4) | 88 | 1700 | 0.430 | 15 | 48 | 37 |
| Formulation Example 15 | (C1) | 88 | 2400 | 0.454 | 30 | 50 | 20 |
| Formulation Example 16 | (C1) | 88 | 2400 | 0.454 | 10 | 60 | 30 |
| Formulation Example 17 | (C1) | 88 | 2400 | 0.454 | 14 | 72 | 14 |
| Formulation Example 18 | (C1) | 88 | 2400 | 0.454 | 14 | 43 | 43 |
| Formulation Example 19 | (C1) | 88 | 2400 | 0.454 | 25 | 60 | 15 |
| Formulation Example 20 | (C1) | 88 | 2400 | 0.454 | 15 | 48 | 37 |
| Formulation Example 21 | (C1) | 88 | 2400 | 0.454 | 15 | 47 | 38 |
| Formulation Example 22 | (C1) | 88 | 2400 | 0.454 | 15 | 47 | 38 |
| Formulation Example 23 | (C1) | 88 | 2400 | 0.454 | 15 | 48 | 37 |
| Formulation Example 24 | (C5) | 72 | 2400 | 0.421 | 15 | 48 | 37 |
| Formulation Example 25 | (C6) | 88 | 1000 | 0.441 | 15 | 48 | 37 |
| Formulation Example 26 | (C1) | 88 | 2400 | 0.454 | 4 | 53 | 43 |
| Formulation Example 27 | (C1) | 88 | 2400 | 0.454 | 56 | 25 | 19 |
| Formulation Example 28 | (C1) | 88 | 2400 | 0.454 | 18 | 78 | 4 |
| Formulation Example 29 | (C1) | 88 | 2400 | 0.454 | 17 | 20 | 63 |

(Evaluation of Vinyl Chloride Polymer Particles)

For the vinyl chloride polymer particles obtained in Example 1, (1) Average particle size, (2) Particle size distribution, (3) Plasticizer absorption, (4) Bulk specific gravity, and (5) The number of fish-eyes when processed into a sheet were evaluated according to the following methods. The evaluation results are shown in Table 2.

(1) Average Particle Size

Using a Tyler standard wire mesh, the particle size distribution was measured by dry sieve analysis, and the average particle size of the vinyl chloride polymer particles was determined.

(2) Particle Size Distribution

The content on a JIS standard 42-mesh sieve was expressed as mass %.
A: Less than 0.5%
B: 0.5% or more and less than 1%
C: 1% or more The content on a JIS standard 60-mesh sieve was expressed as mass %.
A: Less than 5%
B: 5% or more and less than 10%
C: 10% or more The lower the value of each of the content on the 42-mesh sieve and the content on the 60-mesh sieve, it is indicated that the number of coarse particles is smaller, the particle size distribution is sharper, and the polymerization stability is more excellent.

(3) Plasticizer Absorption

The mass of a syringe with a capacity of 5 mL filled with 0.02 g of absorbent cotton was weighed (referred to as A g), then 0.5 g of the vinyl chloride polymer particles was put therein, and the mass was weighed (referred to as B g). 1 g of dioctyl phthalate (DOP) was put therein and was allowed to stand still for 15 minutes, followed by centrifugation at 3000 rpm for 40 minutes to weight the mass (referred to as C g). Then, the plasticizer absorption (%) was determined from the following formula.

$$\text{Plasticizer absorption (\%)}=100\times[\{(C-A)/(B-A)\}-1]$$

(4) Bulk Specific Gravity

The bulk specific gravity of the vinyl chloride polymer particles was measured according to JIS K6721.

(5) Fish-Eyes 100 parts of the obtained vinyl chloride polymer particles, 50 parts of DOP (dioctyl phthalate), 5 parts of tribasic lead sulfate, and 1 part of zinc stearate were subjected to roll kneading at 150° C. for 7 minutes to produce a 0.1-mm thick sheet, and the number of fish-eyes per 100 mm×100 mm was counted.

Examples 2 to 19

The suspension polymerization of vinyl chloride was performed in the same manner as in Example 1 except that the types or the mixing ratio of the aqueous emulsion (a), the PVA (B), and the PVA (C) to be used were changed. Thus, vinyl chloride polymer particles were obtained. The evaluation results for the vinyl chloride polymer particles are shown in Table 2.

Example 20

The suspension polymerization of vinyl chloride was performed in the same manner as in Example 1 except that the amount of deionized water used was changed to 1390 parts in total. Thus, vinyl chloride polymer particles were obtained. The evaluation results for the vinyl chloride polymer particles are shown in Table 3.

Comparative Example 1

The suspension polymerization of vinyl chloride was performed in the same manner as in Example 1 except that a PVA (B7) with a degree of saponification of 88 mol % was used as the PVA (B), and the ratio of the PVA (B) and the PVA (C) used was changed as shown in Table 1. The evaluation results for the vinyl chloride polymer particles are shown in Table 2. In this case, the vinyl chloride polymer particles obtained were coarse and had a large particle size, the ratios of the content on the 42-mesh sieve and the content on the 60-mesh sieve were high, and the polymerization was unstable. The results were such that the plasticizer absorption and the bulk specific gravity were low, and the number of fish-eyes was very large.

Comparative Example 2

The conditions were the same as in Example 1 except that a PVA (B8) with a degree of saponification of 62 mol % was used as the PVA (B). However, the PVA (B8) was not dissolved or dispersed in water, and it was impossible to perform the suspension polymerization.

Comparative Example 3

The conditions were the same as in Example 1 except that a PVA (B9) with a degree of polymerization of 2000 was used as the PVA (B). However, the PVA (B9) was not dissolved or dispersed in water, and it was impossible to perform the suspension polymerization.

Comparative Example 4

The suspension polymerization of vinyl chloride was performed in the same manner as in Example 1 except that a PVA (B10) with a degree of polymerization of 150 was used as the PVA (B), and the ratios of the PVA (B) and the PVA (C) used were changed as shown in Table 1. The evaluation results for the vinyl chloride polymer particles are shown in Table 2. In this case, the vinyl chloride polymer particles obtained were coarse and had a large particle size, the ratios of the content on the 42-mesh sieve and the content on the 60-mesh sieve were high, and the polymerization was unstable. The results were such that the plasticizer absorption and the bulk specific gravity were low, and the number of fish-eyes was very large.

Comparative Example 5

The conditions were the same as in Example 1 except that a PVA (C5) with a degree of saponification of 72 mol % was used as the PVA (C), and the ratios of the PVA (B) and the PVA (C) used were changed as shown in Table 1. However, the PVA (C5) was not dissolved or dispersed in water, and it was impossible to perform the suspension polymerization.

Comparative Example 6

The suspension polymerization of vinyl chloride was performed in the same manner as in Example 1 except that a PVA (C6) with a degree of polymerization of 1000 was used as the PVA (C), and the ratios of the PVA (B) and the PVA (C) used were changed as shown in Table 1. The evaluation results for the vinyl chloride polymer particles are shown in Table 2. In this case, the vinyl chloride polymer particles obtained were coarse and had a large particle size, the ratios of the content on the 42-mesh sieve and the content on the 60-mesh sieve were high, and the polymerization was unstable. The results were such that the bulk specific gravity was low, and the number of fish-eyes was large.

Comparative Example 7

The suspension polymerization of vinyl chloride was performed in the same manner as in Example 1 except that the ratios of the aqueous emulsion (a), the PVA (B), and the PVA (C) used were changed as shown in Table 1. The evaluation results for the vinyl chloride polymer particles are shown in Table 2. In this case, the results were such that the vinyl chloride polymer particles obtained had low plasticizer absorption, and the number of fish-eyes was very large.

Comparative Example 8

The suspension polymerization of vinyl chloride was performed in the same manner as in Example 1 except that the ratios of the aqueous emulsion (a), the PVA (B), and the PVA (C) used were changed as shown in Table 1. The evaluation results for the vinyl chloride polymer particles are shown in Table 2. In this case, the results were such that the vinyl chloride polymer particles obtained were coarse and had a large particle size, the ratios of the content on the 42-mesh sieve and the content on the 60-mesh sieve were high, the polymerization was unstable, the bulk specific gravity was low, and the number of fish-eyes was very large.

Comparative Example 9

The suspension polymerization of vinyl chloride was performed in the same manner as in Example 1 except that the ratios of the aqueous emulsion (a), and polyvinyl alcohol-based polymers (B) and (C) used were changed as shown in Table 1. The evaluation results for the vinyl chloride polymer particles are shown in Table 2. In this case, the vinyl chloride polymer particles obtained were coarse and had a large particle size, the ratio of the content on the 60-mesh sieve was high, and the polymerization was unstable. The bulk specific gravity also was low.

Comparative Example 10

The suspension polymerization of vinyl chloride was performed in the same manner as in Example 1 except that the ratios of the aqueous emulsion (a), and polyvinyl alcohol-based polymers (B) and (C) used were changed as shown in Table 1. The evaluation results for the vinyl chloride polymer particles are shown in Table 2. In this case, the vinyl chloride polymer particles obtained were coarse and had a large particle size, the ratios of the content on the 42-mesh sieve and the content on the 60-mesh sieve were high, and the polymerization was unstable. The results were such that the plasticizer absorption was low, and the number of fish-eyes was very large.

Comparative Example 11

The suspension polymerization of vinyl chloride was performed in the same manner as in Example 1 except that a partially saponified PVA with a degree of polymerization of 160 and a degree of saponification of 50 mol % was used instead of the aqueous emulsion (a). The ratios of the respective components were such that the partially saponified PVA was 15 mass %, the PVA (B1) was 48 mass %, and the PVA (C1) was 37 mass % (referred to as Formulation Example 30). The evaluation results for the vinyl chloride polymer particles are shown in Table 2. In this case, the vinyl chloride polymer particles obtained were coarse and had a large particle size, the ratio of the content on the 60-mesh sieve was high, and the polymerization was unstable. The bulk specific gravity also was low.

Comparative Example 12

The suspension polymerization of vinyl chloride was performed in the same manner as in Example 1 except that the PVA (B1) and the PVA (C1) were not used, and a PVA with a degree of polymerization of 2400 and a degree of saponification of 80 mol % was used instead. The ratios of the respective components were such that the aqueous emulsion (a) was 15 mass %, and the aforementioned PVA was 85 mass % (referred to as Formulation Example 31). The evaluation results for the vinyl chloride polymer particles are shown in Table 2. In this case, the results were such that the vinyl chloride polymer particles obtained had low plasticizer absorption, and the number of fish-eyes was very large.

Comparative Example 13

The suspension polymerization of vinyl chloride was performed in the same manner as in Example 1 except that the PVA (B) and the PVA (C) were not used, and an aqueous emulsion (a7) was used instead of the aqueous emulsion (a1) (referred to as Formulation Example 32). The evaluation results for the vinyl chloride polymer particles are shown in Table 2. In this case, the results were such that, since the PVA (B) and the PVA (C) were not used, the vinyl chloride polymer particles obtained had low plasticizer absorption, and the number of fish-eyes was very large. Further, the aqueous emulsion (a7) used had low solid content and poor economic efficiency.

Comparative Example 14

The suspension polymerization of vinyl chloride was performed in the same manner as in Example 1 except that the PVA (B) was not used, and the ratio of the aqueous emulsion (a1) to the PVA (C) used was changed to 15/85 (referred to as Formulation Example 33). The evaluation results for the vinyl chloride polymer particles are shown in Table 2. In this case, the results were such that, since the PVA (B) was not used, the vinyl chloride polymer particles obtained had low plasticizer absorption, the particles were coarse, and the number of fish-eyes was very large.

Comparative Example 15

The suspension polymerization of vinyl chloride was performed in the same manner as in Example 1 except that the PVA (C) was not used, and ratio of the aqueous emulsion (a1) to the PVA (B) used was changed to 15/85 (referred to as Formulation Example 34). The evaluation results for the vinyl chloride polymer particles are shown in Table 2. In this case, since the PVA (C) was not used, the vinyl chloride polymer particles obtained had low bulk specific gravity, and the particles were coarse.

Comparative Example 16

The suspension polymerization of vinyl chloride was performed in the same manner as in Comparative Example 6 except that the amount of deionized water used was changed to 1390 parts in total. Thus, vinyl chloride polymer particles were obtained. The evaluation results for the vinyl chloride polymer particles are shown in Table 3. In this case, the results were such that the ratio of the resultant vinyl chloride polymer particles on the 60-mesh sieve was high, the polymerization was unstable, and the bulk specific gravity was low. The results were such that the plasticizer absorption was low, and the number of fish-eyes was large. Further, as Examples 1 and 20 in Table 3 are compared respectively with Comparative Examples 6 and 16, the production method of the present invention allows excellent polymerization stability and exerts excellent effects in preventing coarse particles and reducing the number of fish-eyes, even under the polymerization conditions in which the ratio of vinyl chloride used is high, and the polymerization tends to be unstable.

TABLE 2

| | | Evaluation results for vinyl chloride polymer particles | | | | | |
|---|---|---|---|---|---|---|---|
| | | Average | Particle distribution | | | Bulk | |
| | Formulation | particle size (μm) | On 42-mesh sieve | On 60-mesh sieve | Plasticizer absorption (%) | specific gravity (g/cc) | Fish-eyes (number) |
| Example 1 | Formulation Example 1 | 155.4 | A | A | 24.3 | 0.490 | 1 |
| Example 2 | Formulation Example 2 | 154.9 | A | A | 24.1 | 0.480 | 3 |
| Example 3 | Formulation Example 3 | 163.4 | A | A | 23.1 | 0.481 | 5 |
| Example 4 | Formulation Example 4 | 165.4 | A | A | 23.0 | 0.484 | 5 |
| Example 5 | Formulation Example 5 | 154.5 | A | A | 24.7 | 0.492 | 2 |
| Example 6 | Formulation Example 6 | 157.7 | A | A | 25.3 | 0.494 | 0 |
| Example 7 | Formulation Example 7 | 152.8 | A | A | 24.0 | 0.495 | 1 |
| Example 8 | Formulation Example 8 | 148.9 | A | A | 23.7 | 0.499 | 4 |
| Example 9 | Formulation Example 9 | 163.2 | A | A | 24.7 | 0.482 | 1 |
| Example 10 | Formulation Example 10 | 150.2 | A | A | 24.0 | 0.489 | 2 |
| Example 11 | Formulation Example 11 | 150.6 | A | A | 23.3 | 0.492 | 6 |
| Example 12 | Formulation Example 12 | 153.4 | A | A | 23.3 | 0.500 | 8 |
| Example 13 | Formulation Example 13 | 155.2 | A | A | 24.4 | 0.480 | 2 |
| Example 14 | Formulation Example 14 | 159.5 | A | A | 24.5 | 0.476 | 1 |
| Example 15 | Formulation Example 15 | 179.6 | A | B | 26.2 | 0.476 | 4 |
| Example 16 | Formulation Example 16 | 154.3 | A | A | 23.4 | 0.504 | 7 |
| Example 17 | Formulation Example 17 | 163.2 | A | B | 27.5 | 0.472 | 5 |
| Example 18 | Formulation Example 18 | 163.5 | A | A | 22.8 | 0.514 | 10 |
| Example 19 | Formulation Example 19 | 170.2 | A | B | 28.0 | 0.468 | 3 |
| Comparative Example 1 | Formulation Example 20 | 250.9 | C | C | 19.1 | 0.446 | 250 |
| Comparative Example 2 | Formulation Example 21 | — | — | — | — | — | — |
| Comparative Example 3 | Formulation Example 22 | — | — | — | — | — | — |
| Comparative Example 4 | Formulation Example 23 | 264.8 | C | C | 19.4 | 0.450 | 198 |
| Comparative Example 5 | Formulation Example 24 | — | — | — | — | — | — |
| Comparative Example 6 | Formulation Example 25 | 188.5 | B | B | 25.0 | 0.449 | 39 |
| Comparative Example 7 | Formulation Example 26 | 142.1 | B | A | 18.0 | 0.489 | 169 |
| Comparative Example 8 | Formulation Example 27 | 394.8 | C | C | 26.9 | 0.419 | 589 |
| Comparative Example 9 | Formulation Example 28 | 180.3 | A | C | 29.7 | 0.437 | 8 |
| Comparative Example 10 | Formulation Example 29 | 256.8 | C | C | 17.7 | 0.506 | 442 |

TABLE 2-continued

Evaluation results for vinyl chloride polymer particles

| | Formulation | Average particle size (μm) | Particle distribution On 42-mesh sieve | Particle distribution On 60-mesh sieve | Plasticizer absorption (%) | Bulk specific gravity (g/cc) | Fish-eyes (number) |
|---|---|---|---|---|---|---|---|
| Comparative Example 11 | Formulation Example 30 | 183.9 | A | C | 26.2 | 0.450 | 3 |
| Comparative Example 12 | Formulation Example 31 | 142.5 | B | A | 16.8 | 0.509 | 691 |
| Comparative Example 13 | Formulation Example 32 | 166.1 | B | A | 17.0 | 0.510 | 1500 |
| Comparative Example 14 | Formulation Example 33 | 201.2 | B | C | 16.1 | 0.478 | 1800 |
| Comparative Example 15 | Formulation Example 34 | 192.2 | B | C | 26.3 | 0.426 | 38 |

TABLE 3

Evaluation results for viny chloride polymer particles

| | Formulation | Vinyl chloride monomer/ Water | Average particle size (μm) | Particle distribution On 42-mesh sieve | Particle distribution On 60-mesh sieve | Plasticizer absorption (%) | Bulk specific gravity (g/cc) | Fish-eyes (number) |
|---|---|---|---|---|---|---|---|---|
| Example 1 | Formulation Example 1 | 940/1200 | 155.4 | A | A | 24.3 | 0.490 | 1 |
| Example 20 | Formulation Example 1 | 940/1390 | 150.9 | A | A | 24.7 | 0.493 | 0 |
| Comparative Example 6 | Formulation Example 25 | 940/1200 | 188.5 | B | B | 25.0 | 0.449 | 39 |
| Comparative Example 16 | Formulation Example 25 | 940/1390 | 170.0 | A | B | 25.3 | 0.450 | 29 |

Use of the aqueous emulsion (a), the PVA (B), and the PVA (C) satisfying the conditions as defined in the present invention allows excellent polymerization stability to be achieved. According to the production method of the present invention, even under conditions in which the polymerization tends to be unstable in suspension polymerization, specifically, under conditions in which the ratio of the vinyl compound is high, coarse particles are less produced. A vinyl resin that has high plasticizer absorption and that can be easily processed can be obtained. The number of fish-eyes when the vinyl resin is formed into a sheet is small, and the bulk specific gravity is also improved. Further, the aqueous emulsion (a) itself can be introduced into a polymerization vessel in which the suspension polymerization of the vinyl compound is performed. Therefore, the handleability and the economic efficiency are very excellent as compared with conventional partially saponified PVA having low water solubility. Accordingly, the industrial usefulness of the production method of the present invention is exceptionally high.

The invention claimed is:

1. A method for producing a vinyl resin, comprising:
   suspension polymerizing of a vinyl compound in an aqueous medium using a dispersion stabilizer,
   wherein the dispersion stabilizer comprises:
   an aqueous emulsion (a) obtained by dispersing a polymer (A) having an ethylenically unsaturated monomer unit in an aqueous medium;
   a polyvinyl alcohol (B) with a degree of saponification of 65 mol % or more and less than 82 mol % and a viscosity-average degree of polymerization of 250 or more and less than 1,500; and
   a polyvinyl alcohol (C) with a degree of saponification of 82 mol % or more and less than 98 mol % and a viscosity-average degree of polymerization of 1,500 or more and less than 4,000;
   wherein the dispersion stabilizer comprises: 7 to 51 mass % of the polymer (A); 40 to 84 mass % of the polyvinyl alcohol (B); and 9 to 53 mass % of the polyvinyl alcohol (C), with respect to a total amount of the polymer (A), the polyvinyl alcohol (B), and the polyvinyl alcohol (C).

2. The production method according to claim 1, wherein a solid content of the aqueous emulsion (a) is 35 to 70 mass %.

3. The production method according to claim 1, wherein the polymer (A) includes a polyvinyl ester.

4. The production method according to claim 3, wherein the polyvinyl ester is polyvinyl acetate.

5. The production method according to claim 1, wherein a block character of residual vinyl ester groups in each of the polyvinyl alcohol (B) and the polyvinyl alcohol (C) is 0.55 or less.

6. The production method according to claim 1, wherein a mass ratio of the vinyl compound with respect to the aqueous medium is 0.57 to 1.25.

* * * * *